Jan. 20, 1959  R. L. HARTWELL  2,869,858
VIBRATION AND SHOCK ABSORPTIVE CUSHION ELEMENT
Filed Aug. 1, 1956
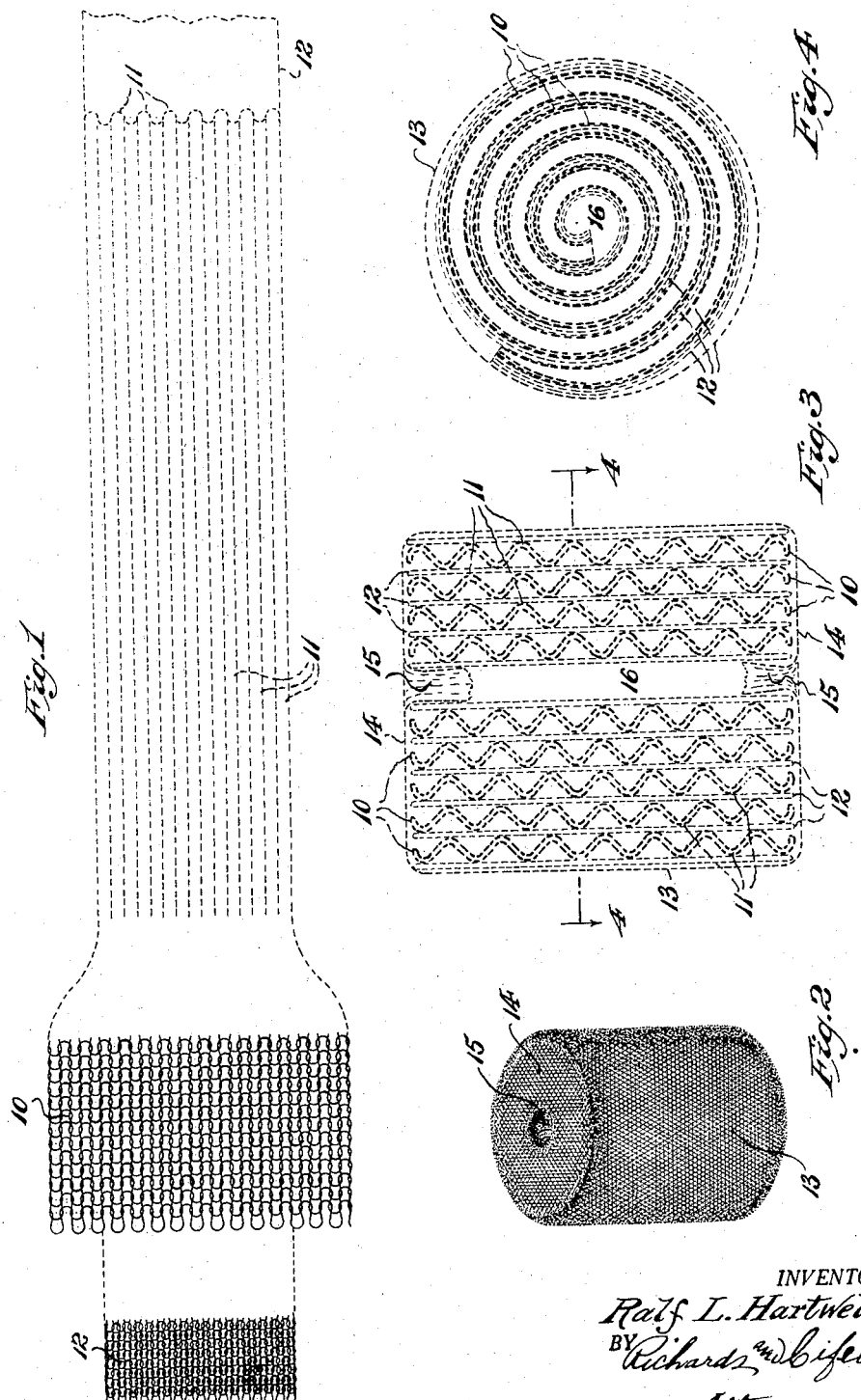
INVENTOR.
Ralf L. Hartwell,
BY Richards and Cifelli,
Attorneys

United States Patent Office 2,869,858
Patented Jan. 20, 1959

2,869,858

VIBRATION AND SHOCK ABSORPTIVE CUSHION ELEMENT

Ralf L. Hartwell, Cranford, N. J., assignor, by mesne assignments, to Metal Textile Corporation, a corporation of Delaware Application August 1, 1956, Serial No. 601,511

8 Claims. (Cl. 267—1)

This invention relates to a novel construction of resilient vibration dampening and shock absorptive cushioning element; and, more particularly, to an element of such character which is produced from knitted wire mesh fabric material.

This invention has for an object to provide a resilient body produced from knitted wire mesh fabric material whereby to provide a body possessing a high degree of reactive elastic compressibility, well adapting it to serve as a load supporting cushion, which will efficiently absorb or dampen vibrations or shocks to which the supported load is subjected in the environment of its use.

The invention has for a further object to provide a shock absorbing and vibration dampening cushioning body which comprises a novel combination of corrugated or crimped knitted wire mesh fabric produced from wire possessing a substantial degree of spring temper, together with non-corrugated or non-crimped knitted wire mesh fabric for cooperation therewith; the latter being adapted, by its frictional contact with said corrugated or crimped knitted wire mesh fabric, to increase the resistance to compressibility of the cushion body under load thrust; all whereby said cushioning body functions with a high degree of efficiency in resisting and absorbing the effects of shock and vibration to which a load, supported by the cushioning body, may be subjected.

Another object of this invention is to provide a vibration and shock absorbing body comprising superposed lengths of longitudinally corrugated or crimped knitted spring wire mesh and non-corrugated or flat knitted wire mesh, said superposed lengths of these materials being rolled or wound upon itself into a substantially cylindrical body formation of selected length or height and of selected diameter, wherein the convolutions thereof comprise mutually contacting, contiguous alternated layers of the corrugated or crimped and non-corrugated or flat knitted wire mesh, and wherein the corrugations or crimps of the corrugated or crimped knitted spring wire mesh are transversely disposed, i. e. are disposed perpendicular to the longitudinal axis of the body, so as to permit reactive elastic compressibility of the body in axial direction, and therefore in the direction of the force or thrust exerted by the load supported by the body, and thus being well adapted to offer increasing tensional resistance to the load thrust with desired vibration and shock absorbing effect.

The above and other objects will be understood from a reading of the following detailed description of an illustrative embodiment of this invention in connection with the accompanying drawings thereof, in which:

Fig. 1 is a plan view of superposed layers of corrugated or crimped knitted spring wire mesh fabric and non-corrugate or flat knitted wire mesh fabric ready to be rolled upon itself into a vibration and shock absorptive cushion element according to this invention.

Fig. 2 is a perspective view of a vibration and shock absorptive cushion element according to this invention.

Fig. 3 is a schematic longitudinal sectional view of the cushion element of Fig. 2, but drawn on an enlarged scale; and Fig. 4 is a transverse horizontal sectional view of the same, taken on line 4—4 in Fig. 3.

Like characters of reference are employed in the hereinabove described views, to indicate corresponding parts.

The cushion element according to this invention is produced substantially as follows:

As shown in Fig. 1, an appropriate length and width of flattened preferably tubular knit wire mesh fabric 10, which is knitted from wire possessing considerable spring temper, is provided. This strip 10 of flattened tubular knit wire fabric is run through corrugating or crimping rolls, whereby to preform therein, throughout the width thereof, successive longitudinally disposed corrugations or crimps 11, preferably parallel to the side edges thereof. The initial width of the strip 10 is such that, when reduced by the corrugations or crimps 11, its ultimate width corresponds to the desired height of a finished cushion element of which it forms a part. The corrugate strip 10 of knit wire mesh fabric is superposed upon a smooth strip 12 of flattened preferably tubular knit wire mesh fabric of a width corresponding to the ultimate width of the corrugate strip 10.

The superposed strips 10 and 12 are together rolled endwise upon themselves into a transversely convolute cushion body formation, wherein convolutions of the smooth strip 12 are alternated with and in contiguous contact with the corrugations 11 of the convolutions of the strip 10 (see Figs. 3 and 4). The cushion body thus produced is of substantially cylindrical form, the height of which is determined by the widths of the superposed strips 10 and 12, and the diameter of which is determined by the lengths of said strips; such diameter being selectively variable by utilizing superposed strips of greater or less length. The convolutions of the strip 12 of smooth knit wire mesh, being interposed between the convolutions of the corrugate strip 10, nesting of the corrugations or crimps of the latter is prevented by said interposed strip 12. The loop or stitch size of the knit wire mesh strip 12 is selected to be sufficiently small as to normally preclude the nesting of the corrugations or crimps of the strip 10.

To retain the convolutions of the cushion body against unwinding, thereby stabilizing the cylindrical form of the body, an external cover sleeve 13, preferably comprising tubular knit wire mesh, is disposed to encircle the sides of the body. This sleeve 13 is of length, sufficiently exceeding the length or height of the cushion body, that its opposite end portions 14 can be inturned over the respective ends of said body, with marginal portions 15 thereof gathered together and then tucked into the ends of an internal axial space 16 of the body which is defined by the innermost convolutions thereof (see Figs. 2 and 3), thus holding the cover sleeve in place. It will be understood however that the enveloping external cover sleeve may be otherwise secured to and around the cushion body in any other desirable or convenient manner.

In the use of the cushioning body as a load supporting means, the longitudinal axis of the body is disposed parallel to the direction of deflective force or thrust exercised by the weight of the load. Since the corrugations or crimps 11 of the corrugated or crimped knitted wire mesh convolute lamination 10 are symmetrically disposed substantially perpendicular to the axis of the body, the same are therefore opposed to the direction of deflective force or thrust exercised by the load. When the cushioning body is compressed under deflective force or thrust of the load, the corrugations or crimps 11 of the convolute lamination 10 will tend to yieldingly and tensionally close, while, at the same time, the interposed smooth convolute lamination 12 will tend to buckle within the troughs of said corrugations or crimps 11 of the convolute lamination 10, thereby increasing resistance to the deflective force or thrust of the load with resultant vibration dampening and shock absorbing effect. Such interaction between the convolute laminations 10 and 12 of the cushioning body is in the nature of a frictional sliding relation thereof one to the other. In addition to this, the knit loops of spring wire of the laminations 10 and 12 are so disposed that their widths lie substantially in vertical planes, and thus parallel to the direction of deflective force or thrust exercised by the load. As a consequence of this, maximum reactive elastic or spring effect of said spring wire loops is assured, and undesirable notching effect is avoided, since the symmetrical disposition of the wires precludes, to a substantial extent, the crossing of one wire by another.

The cushioning body can be selectively produced as to size, selected deflective amplitude, and predetermined spring rate. To such end, the corrugations or crimps 11 of the convolute lamination 10 can be varied in depth and width for control or determination of spring rate, taking into account the gauge and spring temper of the fabric wire, and the amount or scope of deflection desired for a given height and diameter of cushioning body.

Although it is preferable that the corrugations or crimps 11 of the lamination 10 be disposed parallel to the longitudinal sides or edges thereof, some angular variation from such disposition is possible and permissible without departing from the principles of this invention.

From the above, it will now be apparent that this invention provides a cushioning body, for supported load vibration dampening and shock absorbing effect, including a novel disposition of corrugated or crimped spring wire fabric effective to provide maximum recovery of height after deflection of the body under load thrust; a cushioning body having maximum fatigue resistance properties; and a cushioning body which provides non-linear resistance to compression loads.

Having now described my invention, I claim:

1. A load supporting vibration and shock absorbing cushioning body comprising mutually contacting superposed alternated lengths of longitudinally corrugated or crimped knitted spring wire mesh and flat non-corrugated relatively smooth knitted wire mesh rolled lengthwise into a convolute substantially cylindrical body formation, wherein the corrugations or crimps of the former are substantially transversely disposed relative to the axis of the body formation throughout the height thereof.

2. A load supporting vibration and shock absorbing cushioning body comprising mutually contacting superposed alternated lengths of longitudinally corrugated or crimped knitted spring wire mesh and flat non-corrugated relatively smooth knitted wire mesh rolled lengthwise into a convolute substantially cylindrical body formation, wherein the corrugations or crimps of the former are substantially transversely disposed relative to the axis of the body formation throughout the height thereof, and an external jacket of flexible material enveloping said body formation.

3. A load supporting vibration and shock absorbing cushioning body comprising mutually contacting superposed alternated lengths of longitudinally corrugated or crimped knitted spring wire mesh and non-corrugate relatively smooth knitted spring wire mesh rolled lengthwise into a convolute substantially cylindrical body formation, wherein the corrugations or crimps of the former are symmetrically disposed perpendicular to the axis of the body formation throughout the height thereof, the knit loops of at least the corrugated or crimped mesh being disposed with their widths extending parallel to the axis of the body formation.

4. A load supporting vibration and shock absorbing cushioning body comprising mutually contacting superposed alternated lengths of longitudinally corrugated or crimped knitted spring wire mesh and non-corrugate relatively smooth knitted spring wire mesh rolled lengthwise into a convolute substantially cylindrical body formation, wherein the corrugations or crimps of the former are symmetrically disposed perpendicular to the axis of the body formation throughout the height thereof, the knit loops of at least the corrugated or crimped mesh being disposed with their widths extending parallel to the axis of the body formation, and an external jacket of tubular knit wire mesh enveloping said body formation.

5. A load supporting vibration and shock absorbing cushioning body comprising superposed alternated lengths of longitudinally corrugated or crimped knitted spring wire mesh and non-corrugate relatively smooth knitted spring wire mesh rolled lengthwise into a convolute substantially cylindrical body formation, the corrugations or crimps of the former being symmetrically disposed perpendicular to the axis of the body formation throughout the height thereof, and the convolutions of said non-corrugate relatively smooth knitted spring wire mesh being disposed intermediate and in contiguous frictional contact with the convolutions of the corrugated or crimped knitted spring wire mesh, whereby to separate the latter in non-nesting relation.

6. A load supporting vibration and shock absorbing cushioning body comprising superposed alternated lengths of longitudinally corrugated or crimped knitted spring wire mesh and non-corrugate relatively smooth knitted spring wire mesh rolled lengthwise into a convolute substantially cylindrical body formation, the corrugations or crimps of the former being symmetrically disposed perpendicular to the axis of the body formation throughout the height thereof, and the convolutions of said non-corrugate relatively smooth knitted spring wire mesh being disposed intermediate and in contiguous frictional contact with the convolutions of the corrugated or crimped knitted spring wire mesh, whereby to separate the latter in non-nesting relation, and an external jacket of flexible material enveloping said body formation.

7. A load supporting vibration and shock absorbing cushioning body comprising a length of flattened tubular knit spring wire mesh having crimped corrugations extending longitudinally therethrough parallel to its longitudinal edges throughout the width thereof, and a length of non-corrugate relatively smooth flattened tubular knit spring wire mesh, the former being superposed upon the latter and together rolled lengthwise into a convolute substantially cylindrical body formation, wherein the corrugations of the former are symmetrically disposed perpendicular to and thus across the axis of said body formation throughout the height thereof, and the convolutions of the non-corrugate mesh being disposed intermediate and in frictional contiguous contact with the convolutions of the corrugate mesh, whereby to hold the latter in non-nesting relation, the knit loops of at least the corrugated or crimped mesh being disposed with their widths extending parallel to the axis of the body formation, and the knit loop size of the non-corrugate mesh being comparatively smaller than the knit loop size of the corrugated or crimped mesh.

8. A load supporting vibration and shock absorbing cushioning body comprising a length of flattened tubular knit spring wire mesh having crimped corrugations extending longitudinally therethrough parallel to its longitudinal edges throughout the width thereof, and a length of non-corrugate relatively smooth flattened tubular knit spring wire mesh, the former being superposed upon the latter and together rolled lengthwise into a convolute substantially cylindrical body formation, wherein the corrugations of the former are symmetrically disposed perpendicular to and thus across the axis of said body formation throughout the height thereof, and the convolutions of the non-corrugate mesh being disposed intermediate and in contiguous frictional contact with the convolutions of the corrugate mesh, whereby to hold the latter in non-nesting relation, the knit loops of at least the corrugated or crimped mesh being disposed with their widths extending parallel to the axis of the body formation, and the knit loop size of the non-corrugate mesh being comparatively smaller than the knit loop size of the corrugated or crimped mesh and an external jacket of tubular knitted wire mesh enveloping said body formation.

References Cited in the file of this patent

UNITED STATES PATENTS

| | | |
|---|---|---|
| 2,502,545 | Wellborn | Apr. 4, 1950 |
| 2,755,079 | York et al. | July 17, 1956 |

FOREIGN PATENTS

| | | |
|---|---|---|
| 715,796 | Great Britain | Sept. 22, 1954 |